United States Patent [19]

Yamaguchi

[11] Patent Number: 5,040,128
[45] Date of Patent: Aug. 13, 1991

[54] IMAGE PROCESSING APPARATUS

[75] Inventor: Toshiyuki Yamaguchi, Nagoya, Japan

[73] Assignee: Brother Kogyo Kabushiki Kaisha, Japan

[21] Appl. No.: 346,462

[22] Filed: May 2, 1989

[30] Foreign Application Priority Data

May 6, 1988 [JP] Japan ............................ 63-110781

[51] Int. Cl.$^5$ ............................................. G06F 15/20
[52] U.S. Cl. ..................................... 364/518; 340/703
[58] Field of Search ............... 364/518, 521; 340/703, 340/720, 721, 723; 358/11, 12, 75, 80

[56] References Cited

U.S. PATENT DOCUMENTS 4,743,959  5/1988  Frederiksen ................... 358/12 X
4,745,467  5/1988  Sekizawa ........................ 358/80

OTHER PUBLICATIONS

"Computer Graphics and Image Processing" 5, 13 ∝ 40 (1976), pp. 13-40, 1976. A Survey of Techniques for the Display of Continuous Tone Pictures on Bilevel Displays.

Primary Examiner—Heather R. Herndon
Attorney, Agent, or Firm—Oliff & Berridge

[57] ABSTRACT

An image processing apparatus reproduces a color image inputted through an input device, such as an image reader. Information regarding separated colors, e.g. yellow, magenta and cyan, of the input color image is binarized and the image is expressed in eight colors ($2^3$). Color error between quantized output image for the evaluation pixels and quantized input image therefor is calculated on pixel basis for each color component. The color errors for the evaluation pixels are weighted in accordance with a predetermined weighting matrix, and the quantizing value for a pixel in question is determined so that the sum of the weighted color errors and the color error of the pixel in question become minimal. Hence, the output image is reproduced in a color close to that of the input image.

4 Claims, 5 Drawing Sheets

A : PIXEL IN QUESTION

| IDEAL SEPARATED COLOR \ RECORDING COLOR | CYAN | MAGENTA | YELLOW | RED | GREEN | BLUE | WHITE | BLACK |
|---|---|---|---|---|---|---|---|---|
| CYAN | 7 | 1 | 1 | 1 | 8 | 10 | 0 | 10 |
| MAGENTA | 1 | 7 | 1 | 9 | 1 | 8 | 0 | 10 |
| YELLOW | 1 | 1 | 7 | 8 | 9 | 1 | 0 | 10 |

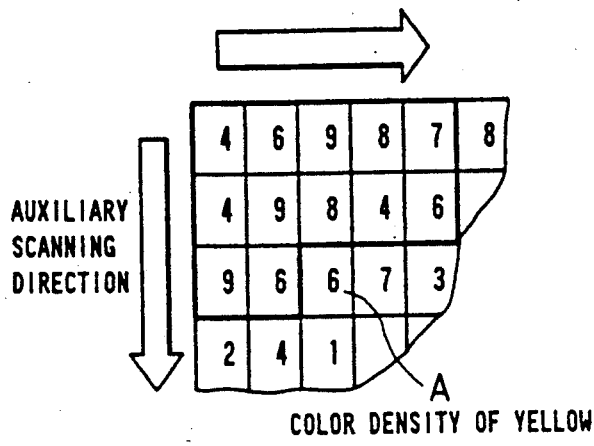
FIG. 5 — COLOR DENSITY OF YELLOW
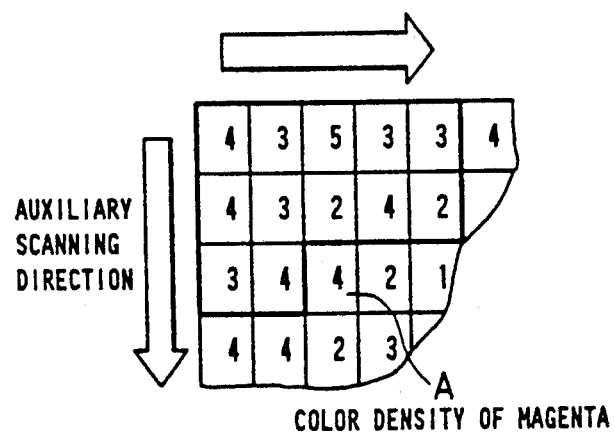
FIG. 6 — COLOR DENSITY OF MAGENTA
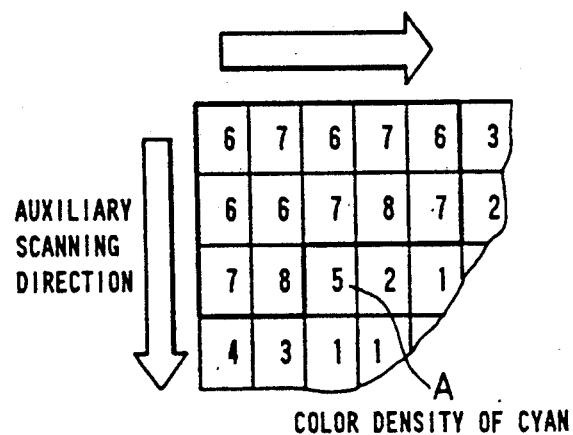
FIG. 7 — COLOR DENSITY OF CYAN

FIG. 8

| CYAN | GREEN | BLACK | GREEN | GREEN |
|---|---|---|---|---|
| GREEN | YELLOW | GREEN | CYAN | GREEN |
| GREEN | CYAN | | | |

| 3 | -3 | -1 | -1 | -2 |
|---|---|---|---|---|
| -3 | 2 | -1 | 3 | -3 |
| 6 | 5 | | | |

A

COLOR ERROR CORR. TO YELLOW

FIG. 10

| 3 | 2 | -5 | 2 | 2 |
|---|---|---|---|---|
| 3 | 2 | 1 | 3 | 1 |
| 2 | 3 | | | |

A

COLOR ERROR CORR. TO MAGENTA

FIG. 11

| -1 | -1 | -4 | -1 | 2 |
|---|---|---|---|---|
| -2 | 5 | -1 | 1 | -1 |
| -1 | 1 | | | |

A

COLOR ERROR CORR. TO CYAN

IMAGE PROCESSING APPARATUS

BACKGROUND OF THE INVENTION

The present invention relates to an image processing apparatus, and more particularly to an apparatus for quantizing a color image.

For processing a color image, it has been customary to produce color-separated images of three colors such as red, green, and blue or yellow, magenta, and cyan from the original color image, and then process the color-separated images. One well known process for quantizing the color-separated images is a minimized average error method. According to this process, the pixels of each color-separated image are successively extracted by main and auxiliary scannings in prescribed directions, and the extracted pixels in question are quantized as follows: First, evaluation pixels which are located in the vicinity of a pixel in question and which have already been quantized are extracted. Then, quantizing errors of the respective evaluation pixels are weighted and totaled. Each element of a weighting matrix as shown in FIG. 2 of the accompanying drawings is widely used to provide weighting values in such a weighting process. The reference letter A in FIG. 2 indicates the pixel in question. Then, the pixel in question is quantized so that the sum of the weighted quantizing errors of the evaluation pixels and a similarly weighted quantizing error of the pixel in question will be minimal. For example, for binarizing a pixel positioned at coordinates (x, y), a threshold value T is determined as follows:

$$T = 0.5 + \sum_{k,l} a_{kl} E(x + k, y + l)$$

where $E(x, Y)$ represents a quantizing error at the coordinates (x, y); and $a_{kl}$, each element of the weighting matrix shown in FIG. 2. Then, the pixel in question is binarized according to the threshold thus determined.

Inks of yellow, magenta, and cyan used in color printers and the like do not have ideal spectral characteristics, but contain other color components. Therefore, eight colors (including a background color) which are produced by using the three-color inks singly or overlappingly do not exhibit ideal spectral characteristics as shown in the table of FIG. 3. And the special characteristics of each color vary nonlinearly. For the reasons described above, a reproduced color image which has been processed in the above manner differs in color tone from the original color image.

SUMMARY OF THE INVENTION

The present invention has been made in an attempt to solve the above problem. It is an object of the present invention to provide an image processing apparatus capable of reproducing a color tone which is close to that of an original image with a simple arrangement.

According to the present invention, in order to achieve the above and other objects, there is provided an image processing apparatus comprising:

scanning means for successively scanning pixels of an input image, each pixel of said input image having a color separable into a predetermined number of color components, one pixel being selected as a pixel in question and a predetermined number of pixels having been scanned preceding to said pixel in question as evaluation pixels;

quantizing means for quantizing each of the color components in the pixels and providing quantized values;

reproducing means for reproducing, based on the quantized values, an output image; and an improvement wherein said quantizing means comprises:

color error calculating means for calculating color errors of the evaluation pixels, the calculation of the color errors being performed on pixel basis with respect to each of the color components, wherein the color errors are defined by differences between the color components of the output image and the color components of the input image:

weighting means for weighting the color errors of the evaluation pixels in accordance with the weighting factor predetermined for each pixel, respectively, and providing weighted color errors; and determining means for determining a quantizing value for the pixel in question so that a sum of the weighted color errors and a color error of the pixel in question becomes minimal.

BRIEF DESCRIPTION OF THE DRAWINGS

In the drawings:

FIGS. 5 through 7 are diagrams showing the color densities of separated colors by way of example;

FIG. 8 is a diagram showing recording colors by way of example; and

FIGS. 9 through 11 are diagrams showing the color errors of separated colors by way of example.

DETAILED DESCRIPTION OF THE PREFERRED EMBODIMENTS

An embodiment of the present invention will hereinafter be described with reference to the drawings.

An image processing apparatus according to the embodiment serves to reproduce an image from a color image entered through an image input device such as an image reader or the like by binarizing information of separated colors, i.e., yellow, magenta, and cyan, of the color image and expressing the image in eight colors ($2^3$).

Figure 1:
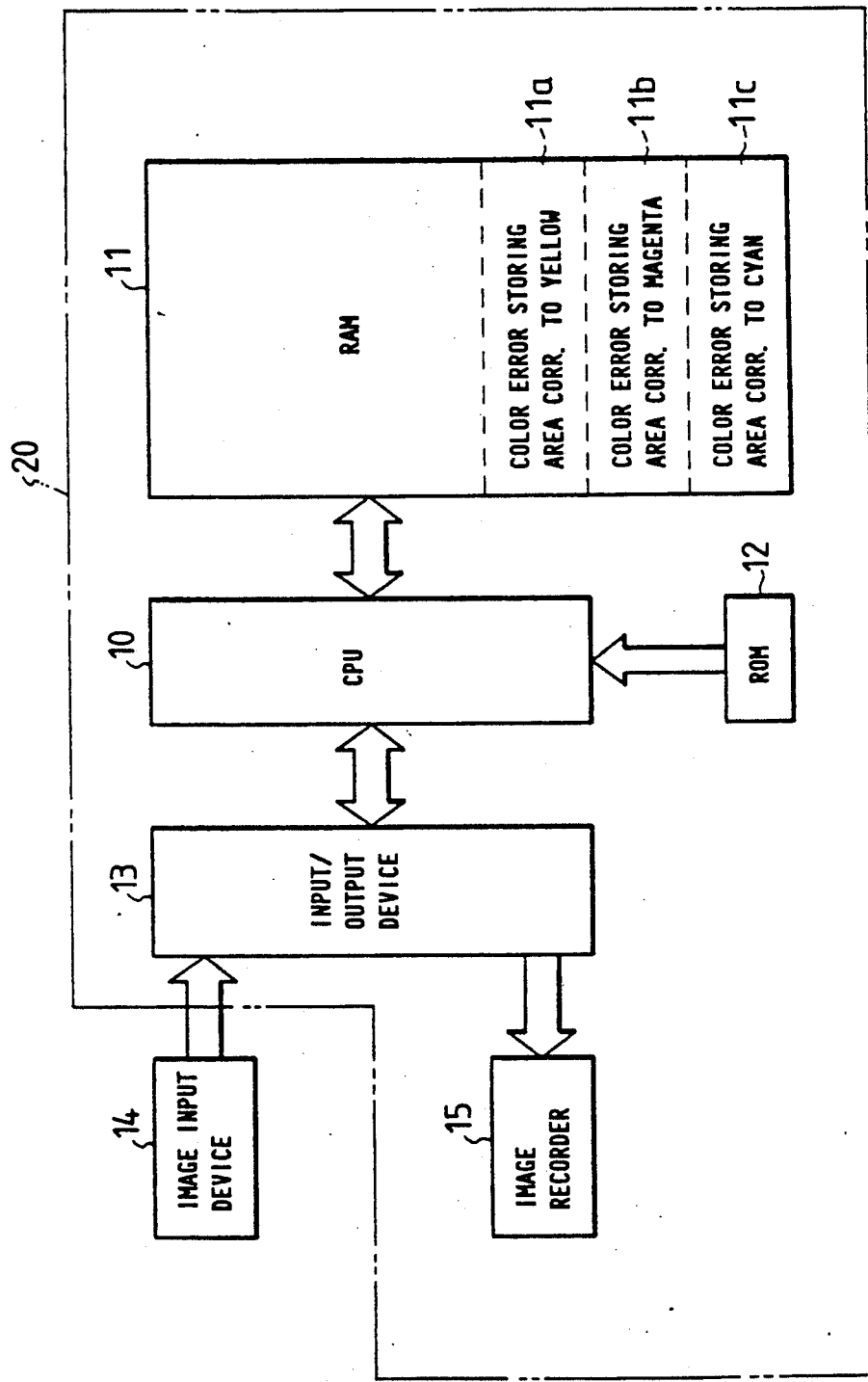
FIG. 1 is a block diagram showing an arrangement according to one embodiment of the present invention.

As shown in FIG. 1, an image processing apparatus 20 comprises a central processing unit (hereinafter referred to as a "CPU") 10 to which a random access memory (RAM) 11 and a read-only memory (ROM) 12 are connected. The RAM 11 has areas for storing color errors corresponding to the separated colors, the storing areas being indicated as color error storing areas 11a through 11c. The ROM 12 stores various constants which will be used in a processing operation, and a program for operating the CPU 10. To the CPU 10, also connected is an input/output device 13 through which an image input device 14 and an image recorder 15 are coupled to the CPU 10.

Operation of the image processing apparatus thus constructed will be described below.

Figure 4:
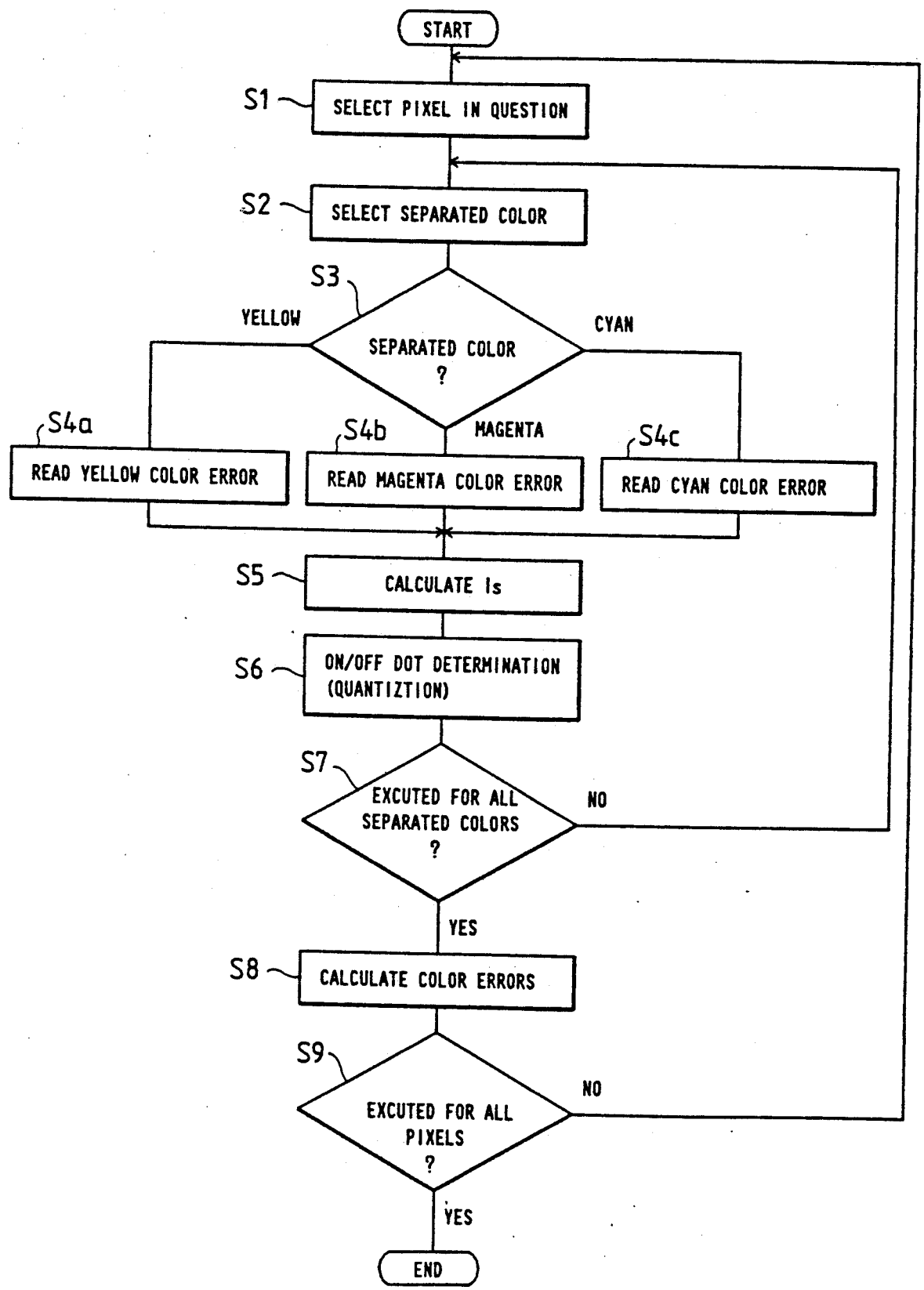
FIG. 4 is a flowchart for description of an operational sequence of the embodiment.

The CPU 10 operates to execute an operation sequence shown in the flowchart of FIG. 4 in accordance with the program stored in the ROM 12. In step S1, the CPU 10 selects a pixel in question on an image which has been entered via the image input device 14, and reads the color densities of separated colors of the pixel in question. Pixels in question are successively selected in a main scanning direction, i.e., to the right from a lefthand upper end and in an auxiliary scanning direction, i.e., in a downward direction. The color densities of the separated colors of each of the successively selected pixels are then binarized. To effect this, a separated color is set in step S2, and the processings according to steps S3 through S7 are effected on the separated color thus set, followed by a return to step S2. More specifically, in step S2, a different separated color is selected each time step S2 is executed. All of the separated colors are processed as follows: Dependent on the separated color selected in step S2, control goes from step S3 to one of the steps S4a through S4c in which a color error for the selected color is read from the corresponding color error storing area 11a, 11b, or 11c in the RAM 11. When the scanning process is started, "0" is stored as the color errors in the color error storing areas 11a, 11b, 11c. Color errors in binarized pixels are successively stored in these color error storing areas in step S8, described later. Therefore, although the color errors are "0" at the start of the scanning, color errors will be read out with respect to the second and the following pixels.

Figures 2, 3:
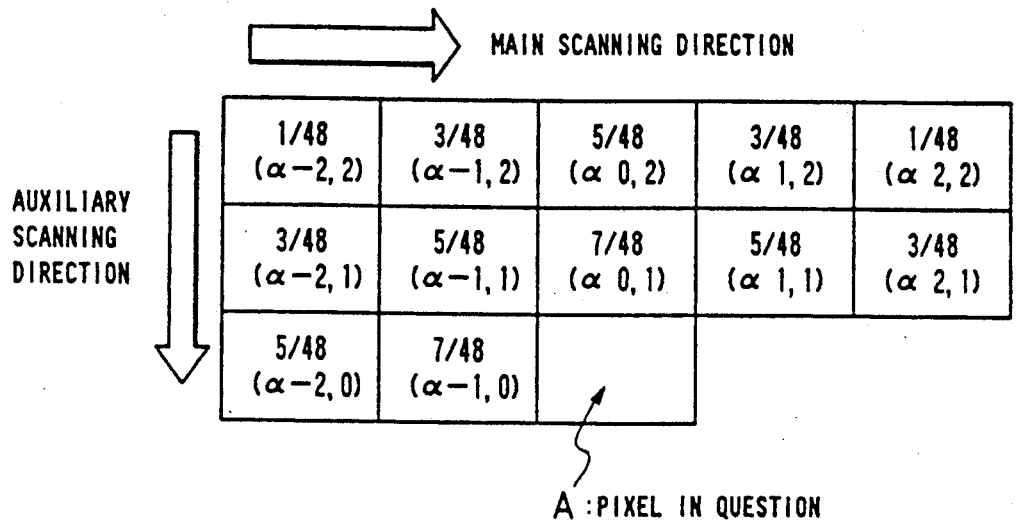
FIG. 2 is a diagram showing a weighting matrix by way of example.
FIG. 3 is a diagram indicating characteristics of recording colors.

Then, control proceeds to step S5 in which the color errors thus read out in each step of S4a, S4b, S4c with respect to the pixels located in the vicinity of the pixel in question are weighted according to the weighting matrix illustrated in FIG. 2, and then the sum of the weighted color errors is calculated. To the calculated total is added the color density Ii of the separated color selected in step S2 for the pixel in question. The sum Io is expressed as follows:

$$Io = Ii + \sum_{i=-2}^{2}\sum_{j=0,1}^{2} \alpha_{ij} \times E_{ij}$$

where $\alpha_{ij}$ indicates a weighting factor of the weighting matrix for the pixel located in i-th position in the main scanning direction and j-th position in the auxiliary scanning direction, and $E_{ij}$ the color error of a pixel positionally corresponding to $\alpha_{ij}$. Then, control goes to step S6 in which the value of Io thus calculated is compared with a preset threshold to binarize (quantize) the separated color density, thereby determining whether the dot of the pixel is on or off. The binarized value (quantized value) minimizes the sum of the weighted color errors of the pixels in the vicinity of the pixel in question and the pixel in question. Information representative of whether the pixel dot is on or off is then sent to the image recorder 15. The image recorder 15 stores the information in an internal buffer thereof, and will subsequently apply inks of the separated colors to a recording sheet based on the stored information en bloc to form a dot in recording colors which include eight colors of yellow, magenta, cyan, red, green, blue, black, and white (background color).

Then, in step S7, it is checked whether or not the processing according to the steps S3 through S6 has been executed on all separated colors with respect to the pixel in question. If not, the routine returns to step S2. The processing is repeated until it is effected on all separated colors, then the routine advances from step S7 to step S8.

In step S8, color errors corresponding to the respective separated colors of the pixel in question are calculated, and stored in the respective color error storing areas 11a through 11c. The color errors thus stored in the RAM 11 are defined as the differences between the color densities of the separated colors of the pixel in question of the entered image and the color density recorded by the image recorder. The separated color components of each of eight colors are experimentally determined and have been stored in advance in the ROM 12. The color errors are calculated by the use of the values stored therein. In the image recorder 15 according to the present embodiment, the separated color components contained in the recorded colors are of the densities as shown in FIG. 3. The color densities indicated in the table of FIG. 3 are normalized while allotting "0" to white (background color) and "10" to black. The color densities of the separated color components read in step S1 are similarly normalized, and the recording colors (reproducing colors) of the pixel are checked based on the information determined in step S6 which indicates whether the dot is on or off. The differences between the separated color components, given in the table of FIG. 3, of the recording colors and the separated color components read in step S1 are determined, and the values of the differences are stored as color errors in color error storing areas 11a through 11c. If the above processing has not been executed with respect to all pixels in step S9, then the routine returns to step S1, and the same processings are performed with respect to the remaining pixels. If the processings have been executed with respect to all pixels in step S9, then the processing operation of the image processing apparatus is terminated.

Processing of specific image data will be described below. It is assumed here that the separated colors of pixels in the vicinity of a pixel in question and the pixel in question have color densities as shown in FIGS. 5 through 7, the color densities having been normalized in the same manner as the color densities shown in FIG. 3. Those pixels enclosed by the thick solid lines in FIGS. 5 through 7 are evaluation pixels, and have already been binarized and recording colors as shown in FIG. 8 are set for those evaluation pixels.

At this time, the color error storing areas store color errors as illustrated in FIGS. 9 through 11. These color errors are calculated as follows: A color error for yellow in a pixel indicated by the arrow B (FIG. 9) is represented by the difference "3" between the color density "4" (see FIG. 5) of yellow of the entered image in the pixel and the color density "1" (see FIG. 3) of yellow which is an ideal separated color of the recorded color "cyan" (see FIG. 8) in the pixel. The color errors for the other separated colors and pixels are calculated in the same manner.

A process of quantizing a pixel in question which is indicated by the arrow A will be described below. The color errors stored in the color error storing areas 11a through 11c are read out, and weighted according to the weighting matrix shown in FIG. 2 with respect to the those pixels enclosed by the thick solid lines in FIGS. 5 through 7. The sum is of the weighted color errors and the color densities of the entered image at the pixel in question are then determined. The sum Is for yellow, magenta, and cyan are indicated by Isy, Ism, Isc, respectively, and given as follows:

$$Isy = 6 + [3 \times (1/48) + (-3) \times (3/48) + \ldots] = 6.52$$

$$Ism = 4 + [3 \times (1/48) + 2 \times (3/48) + \ldots] = 5.33$$

$$Isc = 5 + [(-1) \times (1/48) + (-1) \times (3/48) + \ldots] = 4.73$$

Then, the values of Is and a normalized threshold (5) are compared in step S6. Since the values Is for yellow and magenta are greater than the threshold, the dots of the respective separated colors are determined to on. The dot of the color of cyan is determined to off because the value of Is for cyan is smaller than the threshold. Therefore, the recording color in the pixel in question is red. The color errors of the separated colors in the pixel in question are determined as described above in step S8. Since the separated color components of yellow, magenta, and cyan of the recording color "red" are of "8", "9", and "1" (see FIG. 3), respectively, the differences "−1", "−5", and "−4" between them and the color densities "6", "4", and "5" of the entered image are stored as color errors in the color error storing areas.

The present invention is not limited to the above embodiment, but many changes and modifications may be made therein. For example, if the characteristics of inks used in the image output device are varied, the values of FIG. 3 are also varied accordingly. The weighting matrix shown FIG. 2 is also required to be varied dependent on the resolution required. While yellow, magenta, end cyan are referred to as separated colors in the above embodiment, red, green, and blue may be used as separated colors where an optical display is employed as the image output device. Although the separated color components are binarized in the above embodiment, they may be quantized in multiple values.

With the present invention, as described above, quantized values are determined such that the sum in a predetermined area of color errors at pixels of an image to be reproduced will be minimal. Even if colors to be reproduced by reproducing means do not have ideal spectral characteristics, therefore, a reproduced image has a color tone which is very close to that of an entered image.

What is claimed is:

1. An image processing apparatus, comprising:
   scanning means for successively scanning pixels of an input image, each pixel of said input image having a color separable into a predetermined number of color components, one pixel being selected as a pixel in question and a predetermined number of pixels having been scanned preceding to said pixel in question as evaluation pixels;
   quantizing means for quantizing each of the color components in the pixels and providing quantized values;
   reproducing means for reproducing, based on the quantized values, an output image: and
   wherein said quantizing means comprises:
      color error calculating means for calculating color errors of the evaluation pixels, the calculation of the color errors being performed on a pixel basis with respect to each of the color components, wherein the color errors are defined by differences between the color components of the output image and the color components of the input image;
      weighting means for weighting the color errors of the evaluation pixels in accordance with the weighting factors predetermined for each pixel, respectively, and providing weighted color errors; and
      determining means for determining a quantizing value for the pixel in question so that a sum of the weighted color errors and a color error of the pixel in question becomes minimal.

2. An image processing apparatus according to claim 1, wherein said quantizing means further comprises storing means for storing values corresponding to proportions of the color components of colors reproduceable by said reproducing means, and wherein said color error calculating means determines the color errors in accordance with the color components of the input image and the values stored in said storing means.

3. An image processing apparatus according to claim 2, wherein each pixel of said input image is separated into color components equivalent to yellow, magenta and cyan colors.

4. An image processing apparatus according to claim 2, wherein each pixel of said input image is separated into color components equivalent to red, green and blue colors.

* * * * *